United States Patent
Umeno

(10) Patent No.: US 7,577,182 B2
(45) Date of Patent: Aug. 18, 2009

(54) TRANSMITTER APPARATUS, RECEIVER APPARATUS, TRANSMISSION METHOD, RECEPTION METHOD AND PROGRAM

(75) Inventor: Ken Umeno, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 627 days.

(21) Appl. No.: 10/551,244

(22) PCT Filed: Mar. 26, 2004

(86) PCT No.: PCT/JP2004/004254

§ 371 (c)(1),
(2), (4) Date: Sep. 28, 2005

(87) PCT Pub. No.: WO2004/088868

PCT Pub. Date: Oct. 14, 2004

(65) Prior Publication Data

US 2006/0215734 A1    Sep. 28, 2006

(30) Foreign Application Priority Data

Mar. 28, 2003    (JP)    ............................. 2003-090436

(51) Int. Cl.
*H04B 1/00* (2006.01)
(52) U.S. Cl. ...................... 375/137; 375/149
(58) Field of Classification Search ................ 375/130, 375/140, 295, 298, 137, 149
See application file for complete search history.

(56) References Cited

U.S. PATENT DOCUMENTS

| | | | |
|---|---|---|---|
| 6,377,611 B1 * | 4/2002 | Hwang | 375/140 |
| 6,587,452 B1 * | 7/2003 | Davidovici et al. | 370/342 |
| 6,624,767 B1 * | 9/2003 | Shiu et al. | 341/81 |
| 2002/0136277 A1 * | 9/2002 | Reed et al. | 375/148 |

OTHER PUBLICATIONS

Chaotic Signals for Multiple Access Communications, Department of Electrical Engineering, Tel-Aviv University, Tel-Aviv 69978, Mar. 1995.

* cited by examiner

*Primary Examiner*—Chieh M. Fan
*Assistant Examiner*—Freshteh N Aghdam
(74) *Attorney, Agent, or Firm*—Honigman Miller Schwartz & Cohn LLP

(57) ABSTRACT

An input receiving section 102 of a transmitter apparatus 101 receives inputs of multiple synchronized signals $r_1, \ldots, r_N$, an asynchronizing section 103 outputs multiple asynchronized signals $v_1, \ldots, v_N$ that are obtained by delaying the multiple synchronized signals $r_1, \ldots, r_N$ by time $t_1, \ldots, t_N$, a modulating section 104 modulates the multiple output asynchronized signals $v_1, \ldots, v_N$ to output modulated signal $w_1, \ldots w_L$ ($1 \leq L \leq N$), a transmitting section 105 transmits the output modulated signal $w_1, \ldots w_L$, and the delay time $t_1, \ldots, t_N$ is shorter than a reciprocal number of a minimum value of clock rates of the multiple input received synchronized signals $r_1, \ldots, r_N$, and is desirably proportional to one generated by a chaos random number in particular.

38 Claims, 8 Drawing Sheets

… (1)

TRANSMITTER APPARATUS, RECEIVER APPARATUS, TRANSMISSION METHOD, RECEPTION METHOD AND PROGRAM

TECHNICAL FIELD

The present invention relates to a transmitter apparatus, which is suitable for transmitting multiple synchronized signals in such a way to be efficiently separated from one another at a receiving side, receiver apparatus, transmission method, and a program that causes a computer to execute these.

BACKGROUND ART

Conventionally, CDMA (Code Division Multiple Access) and WCDMA (Wideband CDMA) are proposed as a technique for transmitting multiple signals efficiently.

In CDMA, a transmitting side superimposes different spreading codes on multiple signals and adds them, and transmits a result. A receiving side obtains a correlation between each allocated spreading code and a received signal as being shifted to use a high correlation point as a synchronizing point, and superimposes the spreading codes based on the synchronizing point to restore a signal addressing to the receiving side itself.

In WCDMA that is the most simplest and is currently used in Japan, the transmitting side has two channels, which superimpose different spreading codes on multiple signals and adds them, allocates each of outputs of these systems to an I-channel and a Q-channel, which are different in phase by 90°, and transmits them. Then, these multiple signals are generally synchronized with one another.

Moreover, the document shown below describes the technique of asynchronous user CDMA, and asserts that an amount of interference noise in asynchronous user CDMA is small as compared with synchronous user CDMA.

[Non-patent document 1] M. B. Pursely, Performance Evaluation for Phased-Coded Spread-Spectrum Multiple-Access Communication Part 1: System Analysis, IEEE Trans-Communications, Vol. 25 (1977), pp. 795-799

However, a more excellent technique has been strongly desired that transmits multiple synchronized signals efficiently, facilitates the separation thereof at a receiving side to reduce a bit error rate.

It is an object of the present invention is to provide a transmitter apparatus, which is suitable for transmitting multiple synchronized signals in such a way to be efficiently separated from one another at a receiving side, receiver apparatus, transmission method, and a program that causes a computer to execute these.

DISCLOSURE OF INVENTION

In order to attain the above object, the following invention is disclosed according to the principle of the present invention.

A transmitter apparatus according to a first aspect of the present invention includes an input receiving section, an asynchronizing section, a modulating section, and a transmitting section, and is configured as follows.

Namely, the input receiving section receives inputs of multiple synchronized signals $r_1, \ldots, r_N$.

While, the asynchronizing section delays the multiple input received synchronized signals $r_1, \ldots, r_N$ by time $t_1, \ldots, t_N$ to output multiple asynchronized signals $v_1, \ldots, v_N$.

Moreover, the modulating section modulates the output multiple asynchronized signals $v_1, \ldots, v_N$ to output modulated signals $w_1, \ldots, w_L (1 \leq L \leq N)$.

Then, the transmitting section transmits the output modulated signals $w_1, \ldots, w_L$.

Herein, the delay time $t_1, \ldots, t_N$ is shorter than a reciprocal number of a minimum value of clock rates of the multiple input received synchronized signals $r_1, \ldots, r_N$.

Furthermore, the transmitter apparatus of the present invention further includes a storing section, the storing section stores the delay time $t_1, \ldots, t_N$ in advance, and the asynchronizing section can be configured to delay the respective multiple synchronized signals $r_1, \ldots, r_N$ by the time $t_1, \ldots, t_N$ stored in the storing section.

Moreover, in the transmitter apparatus of the present invention, the modulating section can be structured to classify the asynchronized signals $v_1, \ldots, v_N$ into $L (L \leq N)$ signal groups to send the respective classified L signal groups to any one of L spread spectrum modulators not to be overlapped with one another to output the modulated signals $w_1, \ldots, v_L$.

Furthermore, in the transmitter apparatus of the present invention, the transmitting section can be configured to radio-transmit the respective modulated signals $w_1, \ldots, w_L$ by L radio frequency modulators each using a different carrier frequency.

Moreover, in the transmitter apparatus of the present invention, the transmitting section can be configured to send the modulated signals $w_1, \ldots, w_L$ to an I-channel and a Q-channel of each of L/2 radio frequency modulators each using a different carrier frequency not to be overlapped with one another to radio-transmit the respective obtained transmitting signals.

Furthermore, in the transmitter apparatus of the present invention, L=2 can be configured to be established.

Moreover, in the transmitter apparatus of the present invention, delay time $t_1, \ldots, t_N$ can be configured to proportional to $u_1, \ldots, u_N$. that is determined by the following equation by a prestored integer value a and a predetermined nonlinear transformation $f(\bullet)$ over a finite field:

$$u_1 = a;$$

$$u_{j+1} = f(u_j)(1 \leq j < N).$$

Furthermore, the prestored value a can be configured to be updated to $a = f(u_N)$ every time when predetermined time passes, and thereby the delay time $t_1, \ldots, t_N$ is updated.

Moreover, in the transmitter apparatus of the present invention, the predetermined nonlinear transformation $f(\bullet)$ over a finite field can be configured to correspond to any one of the following (a) to (e):

(a) transformation using a Chebyshev polynomial of second or more degree, (b) transformation using Bernoulli mapping, (c) transformation $f(x) = 2x^2 - px + q \pmod{2^w}$ defined using integers p, q (p mod 4 =1, $0 \leq q \leq 2^w - 1$), (d) transformation using a remainder obtained by dividing any one of transformation results of (a) to (c) by a predetermined integer, and (e) transformation that is the same form as any one of the above (a) to (d) by a linear coordinate transformation.

A receiving apparatus according to another aspect of the present invention includes a receiving section, a delaying section, a demodulating section, and an outputting section, and is configured as follows.

Namely, the receiving section receives multiple signals as $a_1, \ldots, a_L (1 \leq L)$.

While, the delaying section delays the respective multiple received signals $a_1, \ldots, a_L$ by time $T - t_1, \ldots, T - t_N (L \leq N)$ where T is predetermined constant time without being overlapped with one another to output multiple intermediate signals $p_1, \ldots, p_N$.

Moreover, the demodulating section demodulates the multiple output intermediate signals $p_1, \ldots, p_N$ to output demodulated signals $r_1, \ldots, r_N$.

Then, the outputting section outputs the multiple output demodulated signals $r_1, \ldots, r_N$ as multiple transmitted synchronized signals.

Furthermore, the receiver apparatus of the present invention further includes a storing section, and can be configured as follows.

Namely, the storing section stores the predetermined constant time T and time $t_1, \ldots, t_N$ in advance.

While, the delaying section obtains delay time of the respective multiple synchronized signals $r_1, \ldots, r_N$ from time stored in the storing section and delays the synchronized signals by the time $T-t_1, \ldots, T-t_N$.

Moreover, in the receiving apparatus of the present invention, the delaying section can be configured to classify the delay time $T-t_1, \ldots, T-t_N$ into L delay time groups to use the respective classified L delay time groups not to be overlapped with the received signals $a_1, \ldots, a_L$ to output the intermediate signals $p_1, \ldots, p_N$.

Furthermore, in the receiving apparatus of the present invention, the receiving section can be configured to obtain the respective received signals $a_1, \ldots, a_L$ from L radio frequency modulators each using a different carrier frequency.

Moreover, in the receiving apparatus of the present invention, the receiving section can be configured to obtain the received signals $a_1, \ldots, a_L$ from I-channels and Q-channels of each of L/2 radio frequency modulators each using a different carrier frequency not to be overlapped with one another.

Furthermore, in the receiving apparatus of the present invention, L=2 can be configured to be established.

Moreover, in the receiving apparatus of the present invention, the time $t_1, \ldots, t_N$ can be configured to be proportional to $u_1, \ldots, u_N$ that is determined by the following equation by a prestored integer value a and a predetermined nonlinear transformation $f(\bullet)$ over a finite field:

$$u_1 = a;$$

$$u_{j+1} = f(u_j)(1 \leq j < N).$$

Furthermore, in the receiving apparatus of the present invention, the prestored value a can be configured to be updated to $a=f(u_N)$ every time when predetermined time passes, and thereby the delay time $t_1 \ldots, t_N$ is updated.

Moreover, in the receiving apparatus of the present invention, the predetermined nonlinear transformation $f(\bullet)$ over a finite field can be configured to correspond to any one of the following (a) to (e):

(a) transformation using a Chebyshev polynomial of second or more degree, (b) transformation using Bernoulli mapping, (c) transformation $f(x)=2x^2-px+q(\mod 2^w)$ defined using integers p, q (p mod 4=1, $0 \leq q \leq 2^w-1$), (d) transformation using a remainder obtained by dividing any one of transformation results of (a) to (c) by a predetermined integer, and (e) transformation that is the same form as any one of the above (a) to (d) by a linear coordinate transformation.

A transmission method according to still another aspect of the present invention includes an input receiving step, an asynchronizing step, a modulating step, and a transmitting step, and is configured as follows:

Namely, in the input receiving step, inputs of multiple synchronized signals $r_1, \ldots, r_N$ are received.

While, in the asynchronizing step, the multiple input received synchronized signals $r_1, \ldots, r_N$ are delayed by time $t_1, \ldots, t_N$ to output multiple asynchronized signals $v_1, \ldots, v_N$.

Moreover, in the modulating step, the output multiple asynchronized signals $v_1, \ldots, v_N$ are modulated to output modulated signals $w_1, \ldots, w_L (1 \leq L \leq N)$.

Then, in the transmitting step, the output modulated signals $w_1, \ldots, w_L$ are transmitted.

While, the delay time $t_1, \ldots, t_N$ is shorter than a reciprocal number of a minimum value of clock rates of the multiple input received synchronized signals $r_1, \ldots, r_N$.

Moreover, in the transmission method of the present invention, a storing section that stores the delay time $t_1, \ldots, t_N$ in advance is used; and the respective multiple synchronized signals $r_1, \ldots, r_N$ can be configured to be delayed by the time $t_1, \ldots, t_N$ stored in the storing section in the asynchronizing step.

Furthermore, in the transmission method of the present invention, the asynchronized signals $v_1, \ldots, v_N$ are classified into $L(L \leq N)$ signal groups and the respective classified L signal groups can be configured to be sent to any one of L spread spectrum modulators not to be overlapped with one another to output the modulated signals $w_1, \ldots, w_L$ in the modulating step.

Moreover, in the transmission method of the present invention, the respective modulated signals $w_1, \ldots, w_L$ can be configured to be radio-transmitted by L radio frequency modulators each using a different carrier frequency in the transmitting step.

Furthermore, in the transmission method of the present invention, the modulated signals $w_1, \ldots, w_L$ can be configured to be sent to I-channels and Q-channels of each of L/2 radio frequency modulators each using a different carrier frequency not to be overlapped with one another to radio-transmit each of the obtained transmitting signals in the transmitting step.

Moreover, in the transmission method of the present invention, L=2 can be configured to be established.

Furthermore, in the transmission method of the present invention, delay time $t_1, \ldots, t_N$ can be configured to be proportional to $u_1, \ldots, u_N$ that is determined by the following equation by a prestored integer value a and a predetermined nonlinear transformation $f(\bullet)$ over a finite field:

$$u_1 = a;$$

$$u_{j+1} = f(u_j)(1 \leq j < N).$$

Moreover, in the transmission method of the present invention, the prestored value a can be configured to be updated to $a=f(u_N)$ every time when predetermined time passes, and thereby delay time $t_1, \ldots, t_N$ is updated.

Furthermore, in the transmission method of the present invention, the predetermined nonlinear transformation $f(\bullet)$ over a finite field can be configured to correspond to any one of the following (a) to (e):

(a) transformation using a Chebyshev polynomial of second or more degree, (b) transformation using Bernoulli mapping, (c) transformation $f(x)=2x^2-px+q(\mod 2^w)$ defined using integers p, q (p mod 4=1, $0 \leq q \leq 2^w-1$), (d) transformation using a remainder obtained by dividing any one of transformation results of (a) to (c) by a predetermined integer, and (e) transformation that is the same form as any one of the above (a) to (d) by a linear coordinate transformation.

A reception method according to still another aspect of the present invention includes a receiving step, a delaying step, a demodulating step, and an outputting step, and is configured as follows.

Namely, in the receiving step, multiple signals are received as $a_1, \ldots, a_L$ ($1 \leq L$).

While, in the delaying step, the respective multiple received signals $a_1, \ldots, a_L$ are delayed by time $T-t_1, \ldots, T-t_N$ ($L \leq N$) where T is predetermined constant time without being overlapped with one another to output multiple intermediate signals $p_1, \ldots, p_N$.

Moreover, in the demodulating step, the multiple output intermediate signals $p_1, \ldots, p_N$ are demodulated to output demodulated signals $r_1, \ldots, r_N$.

Then, in the outputting step, the multiple output demodulated signals $r_1, \ldots, r_N$ are output as multiple transmitted synchronized signals.

Furthermore, in the reception of the present invention, a storing section that stores the predetermined constant time T and time $t_1, \ldots, t_N$ in advance is used; and delay time of the respective multiple synchronized signals $r_1, \ldots, r_N$ is obtained from time stored in the storing section and the synchronized signals can be configured to be delayed by time $T-t_1, \ldots, T-t_N$ in the delaying step.

Moreover, in the reception of the present invention, the delay time $T-t_1, \ldots, T-t_N$ are classified into L delay time groups, and the respective classified L delay time groups can be configured to be used not to be overlapped with the received signal $a_1, \ldots, a_L$ to output the intermediate signals $p_1, \ldots, p_N$ in the delaying step.

Furthermore, in the reception of the present invention, the respective received signals $a_1, \ldots, a_L$ can be configured to be obtained from L radio frequency modulators each using a different carrier frequency in the receiving step.

Moreover, in the reception of the present invention, the received signals $a_1, \ldots, a_L$ can be configured to be obtained from I-channels and Q-channels of each of L/2 radio frequency modulators each using a different carrier frequency not to be overlapped with one another in the receiving step.

Furthermore, in the reception of the present invention, L=2 can be configured to be established.

Moreover, time $t_1, \ldots, t_N$ can be configured to be proportional to $u_1, \ldots, u_N$ that is determined by the following equation by a prestored integer value a and a predetermined nonlinear transformation $f(\bullet)$ over a finite field:

$u_1 = a;$ $u_{j+1} = f(u_j)(1 \leq j < N).$

Furthermore, the prestored value a can be configured to be updated to $a = f(u_N)$ every time when predetermined time passes, and thereby the delay time $t_1, \ldots, t_N$ is updated.

Moreover, the predetermined nonlinear transformation $f(\bullet)$ over a finite field can be configured to correspond to any one of the following (a) to (e):

(a) transformation using a Chebyshev polynomial of second or more degree, (b) transformation using Bernoulli mapping, (c) transformation $f(x) = 2x^2 - px + q \pmod{2^w}$ defined using integers p, q (p mod 4=1, $0 \leq q \leq 2^w - 1$), (d) transformation using a remainder obtained by dividing any one of transformation results of (a) to (c) by a predetermined integer, and (e) transformation that is the same form as any one of the above (a) to (d) by a linear coordinate transformation.

A program according to still another aspect of the present invention causes a computer (including FPGA (Field Programmable Gate Array), DSP (Digital Signal Processor), ASIC (Application Specific Integrated Circuit)) to function as the transmitter apparatus or receiver apparatus, and causes the computer to execute the transmission method or the reception method.

The program can be recorded on a computer-readable information storage medium such as a compact disk, a flexible disk, a hard disk, a magneto-optical disk, a digital video disk, a magnetic disk, a semiconductor memory.

The program can be distributed and sold via a computer network independently of the radio communication terminal by the program is executed.

BEST MODE FOR CARRYING OUT THE INVENTION

The following will explain embodiments of the present invention. Various embodiments and changes may be made thereunto without departing from the broad spirit and scope of the invention. The embodiments described below are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

(Embodiment of Transmitter Apparatus)

Figure 1:
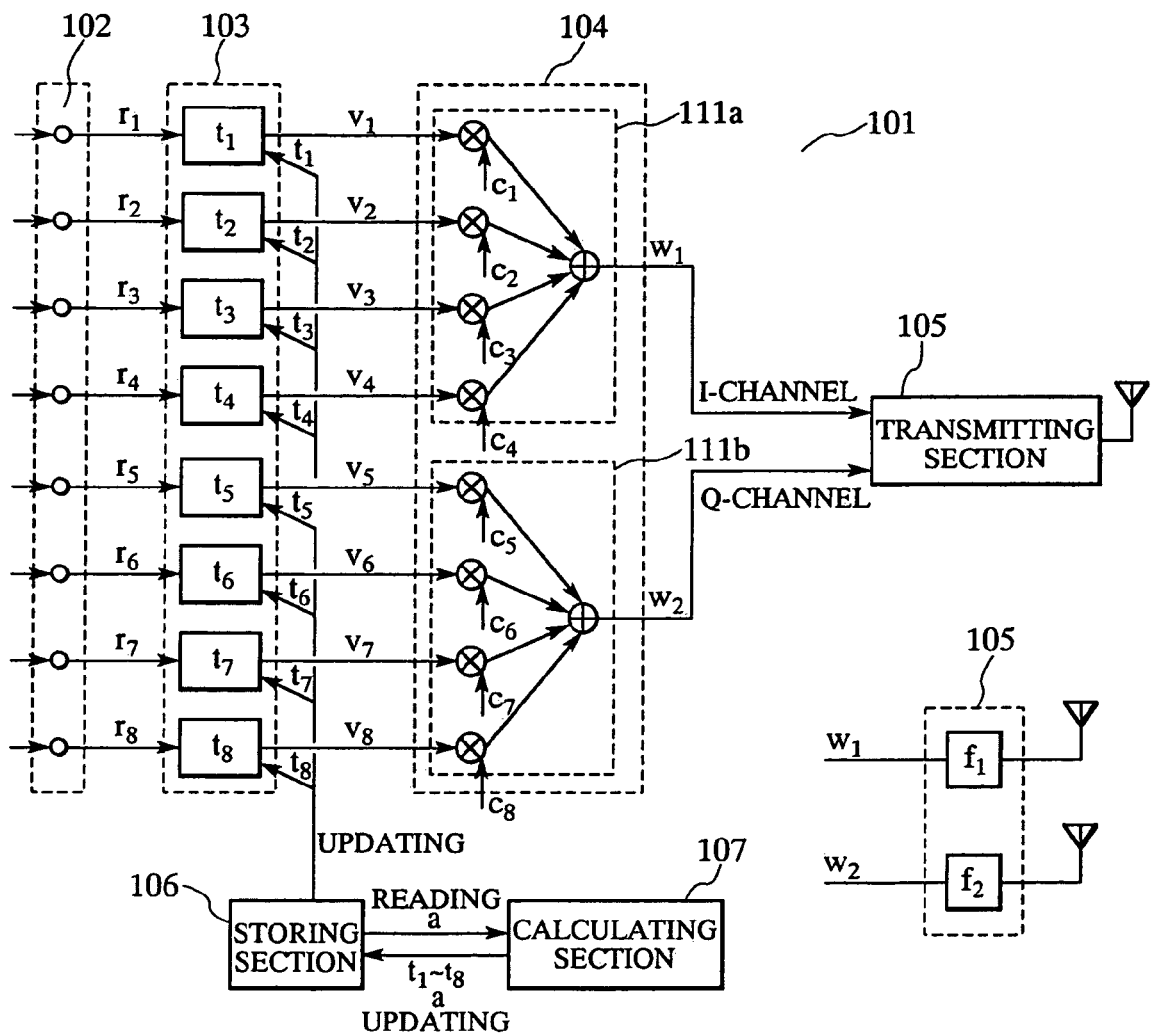
FIG. 1 is a schematic view illustrating an outline configuration of a transmitter apparatus according to an embodiment of the present invention.

FIG. 1 is a schematic view illustrating an outline confirmation of a transmitter apparatus according to one embodiment of the present invention. An explanation will be given as follows with reference to this figure.

A transmitter apparatus 101 includes an input receiving section 102, an asynchronizing section 103, a modulating section 104, a transmitting section 105, a storing section 106, and a calculating section 107.

First of all, the input receiving section 102 receives inputs of multiple synchronized signals $r_1, \ldots, r_N$. This figure indicates a case of N=8. These synchronized signals correspond to the following signals.

(1) signals to be transmitted to the respective multiple mobile terminals in a cell of a certain base station from the base station; and (2) signals of various data such as speech, image, and signals of control data to be transmitted to mobile stations in multi-channel CDMA and multi-channel WCDMA.

Then, the asynchronizing section 103 outputs multiple asynchronized signals $v_1, \ldots, v_N$ that are obtained by delaying the multiple input received synchronized signals $r_1, \ldots, r_N$ by time $t_1, \ldots, t_N$.

It is herein assumed that delay time $t_1, \ldots, t_N$ is shorter than a reciprocal number (hereinafter referred to as W) of a minimum value of clock rates of the multiple input received synchronized signals $r_1, \ldots, r_N$.

In the present embodiment herein, delay time $t_1, \ldots, t_N$ is prestored in the storing section 106. Moreover, the calculating section 107 performs the following calculation based on a recurrence formula using an integer a prestored in the storing section 106, a predetermined nonlinear transformation $f(\bullet)$ over a finite field, a predetermined proportional coefficient c, thereby delay time $t_1, \ldots, t_N$ may be fixed to be proportional to obtained $u_1, \ldots, u_N$.

$$u_1 = a;$$

$$u_{j+1} = f(u_j)(1 \leq j < N)$$

Moreover, the calculating section 107 may update the integral value stored in the storing section 106 to $a = f(u_N)$ every time when predetermined time passes, and recalculate delay time $t_1, \ldots, t_N$ according to the update.

For example, when the following equation is given where a constant S, which determines 0<S<W, is predetermined and a maximum value of $u_1, \ldots, u_N$ is set to U, $t_1, \ldots, t_N$ that satisfies the above condition can be obtained.

$$t_i = S u_i/U (1 \leq i < N)$$

Now, it can be considered that the predetermined nonlinear transformation $f(\bullet)$ over a finite field includes the following (a) to (e).

(a) Transformation using a Chebyshev polynomial of second or more degree. Namely, a polynomial that is defined by the following equation is used.

$$F(\cos \theta) = \cos(m\theta)(m \geq 2)$$

When m=2, the following equation is established:

$$f(x) = 2x^2 - 1$$

When m=3, the following equation is established:

$$f(x) = 4x^3 - 3x$$

When 15 m=4, the following equation is established:

$$f(x) = 8x^4 - 8x^2 + 1$$

(b) Transformation using Bernoulli mapping. Though the Chebyshev polynomial can be used as chaos mapping, the Bernoulli mapping is also one of chaos mapping.

(c) Transformation $f(x) = 2x^2 - px + q \pmod{2^w}$ defined using integers p, q (p mod 4=1, $0 \leq q \leq 2^w - 1$).

(d) Transformation using a remainder obtained by dividing any one of transformation results of (a) to (c) by a predetermined integer. For example, in the case where a calculation is performed using the Chebyshev polynomial by a computer, an expression using a remainder is considered as an integer expression. For instance, there is a form considering 32 bits as accuracy of an integer and only lower 32 bits as used in addition, subtraction, multiplication, and division; and (e) Transformation that is the same form as any one of the above (a) to (d) by a linear coordinate transformation.

Thus obtained $t_1, \ldots, t_N$ are random numbers of a certain kind by which synchronization of multiple synchronized signals is disturbed, resulting in multiple asynchronized signals $v_1, \ldots, v_N$.

Accordingly, various kinds of pseudorandom number generation methods may be used to fix $t_1, \ldots, t_N$. Moreover, there may be used a form in which $t_1, \ldots, t_N$ that are fixed as random numbers are prepared and used repeatedly.

Furthermore, the modulating section 104 modulates output multiple asynchronized signals $v_1, \ldots, v_N$. In the present embodiment, the modulating section 104 includes L spread spectrum modulators 111. The asynchronized signals $v_1, \ldots, v_N$ are classified into L (L≤N) signal groups and the respective classified L signal groups are sent to these spread spectrum modulators 111 not to be overlapped with one another. In this figure, they are classified into two signal groups (L=2) and $v_1, \ldots, v_4$ are sent to the spread spectrum modulator 111a and $v_5, \ldots, v_8$ are sent to the spread spectrum modulator 111b, respectively.

Each of the spread spectrum modulators 111 illustrated in this figure superimposes four different spreading codes on the input asynchronized signals and adds them to perform spread spectrum modulation. Additionally, it is desirable that the set of spreading codes used by the spread spectrum modulators 111 be not overlapped with one another. However, the spread spectrum modulators 111 using the set of same spreading codes and the set of spreading codes, which are partially overlapped with one another, can be applied to the respective signal groups depending on the applied filed.

The modulating section 104 finally outputs modulated signals $w_1, \ldots, w_L$. In an example illustrated in this figure, since the respective spread spectrum modulators 111 output signals, respectively, $w_1$ and $w_2$ are output.

Then, the transmitting section 105 transmits the output modulated signals $w_1, \ldots, w_L$. In this figure, $w_1$ and $w_2$ are sent to an I-channel and a Q-channel, which are different in phase by 90°, so that transmission, which is similar to the conventional WCDMA, is performed.

Additionally, as illustrated in the lower portion in this figure, the transmitting section 105 may radio-transmit the respective modulated signals $w_1, \ldots, w_L$ by radio frequency modulators each using a different carrier frequency.

(Embodiment of Receiver Apparatus)

When the signal to be transmitted to one receiving side is any one of $r_i$, the use of general receiver apparatus for CDMA, which obtains correlation to achieve synchronization, can restore $r_i$ at the receiving side.

The following will explain an embodiment of the receiving apparatus in which signals required for the receiving side are $r_1, \ldots, r_N$. Namely, this embodiment shows a case in which the respective signals correspond to a speech signal, an image signal, various kinds of data signals, a control data signal, and one terminal uses these multiple signals. Also, this embodiment can be applied as a mobile station for multi-channel CDMA (CDMA 2000) and multi-channel WCDMA.

Figure 2:
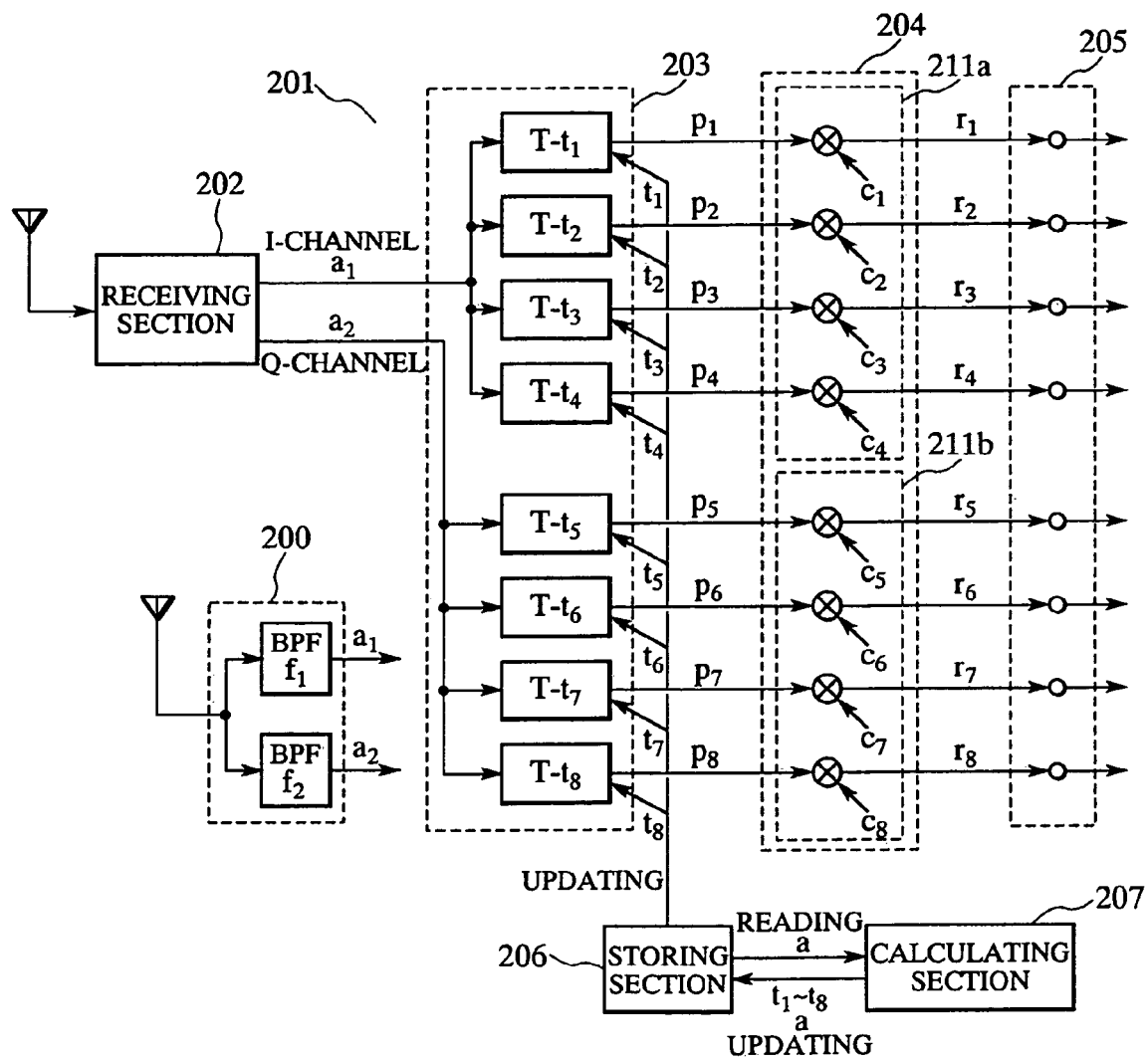
FIG. 2 is a schematic view illustrating an outline configuration of a receiver apparatus according to an embodiment of the present invention.
Figure 3:
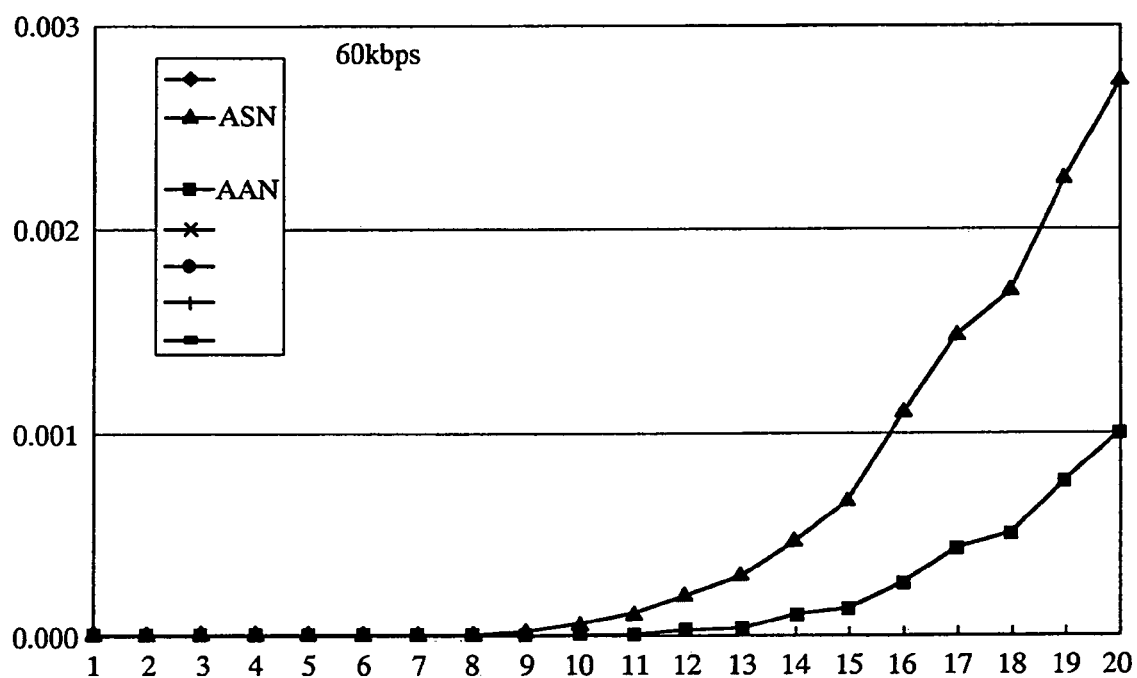
FIG. 3 is a graph illustrating a result of simulation for evaluating a bit error rate in each of a case in which the present invention is applied to WCDMA communication and a case in which the present invention is not applied thereto.
Figure 4:
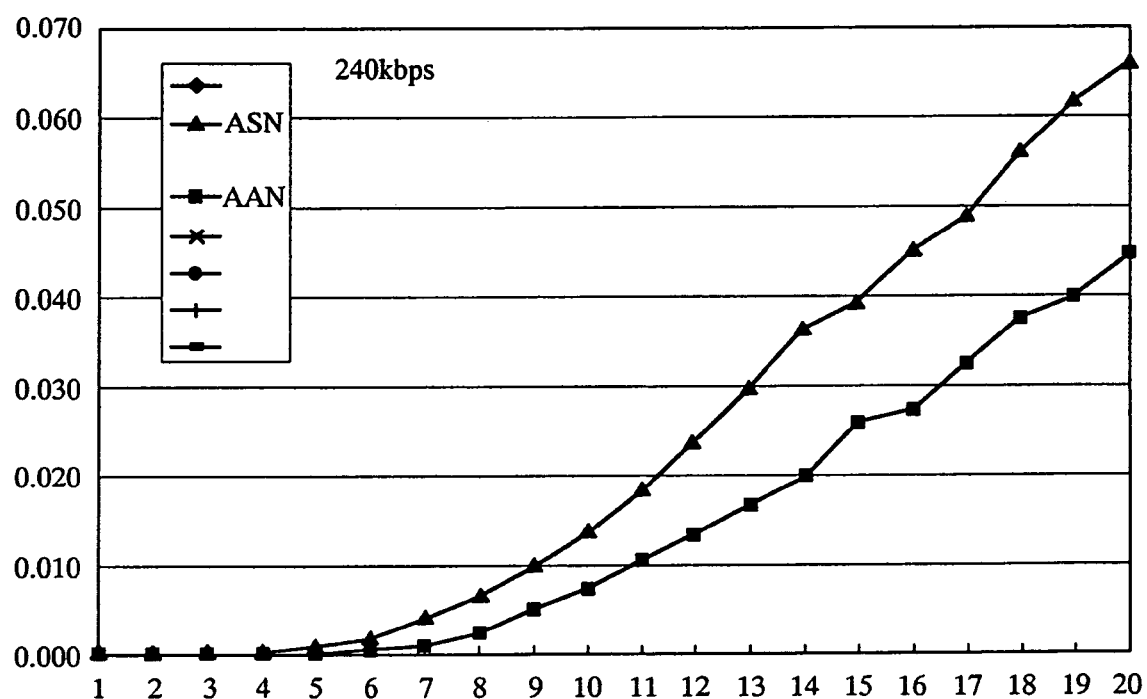
FIG. 4 is a graph illustrating a result of simulation for evaluating a bit error rate in each of a case in which the present invention is applied to WCDMA communication and a case in which the present invention is not applied thereto.
Figure 5:
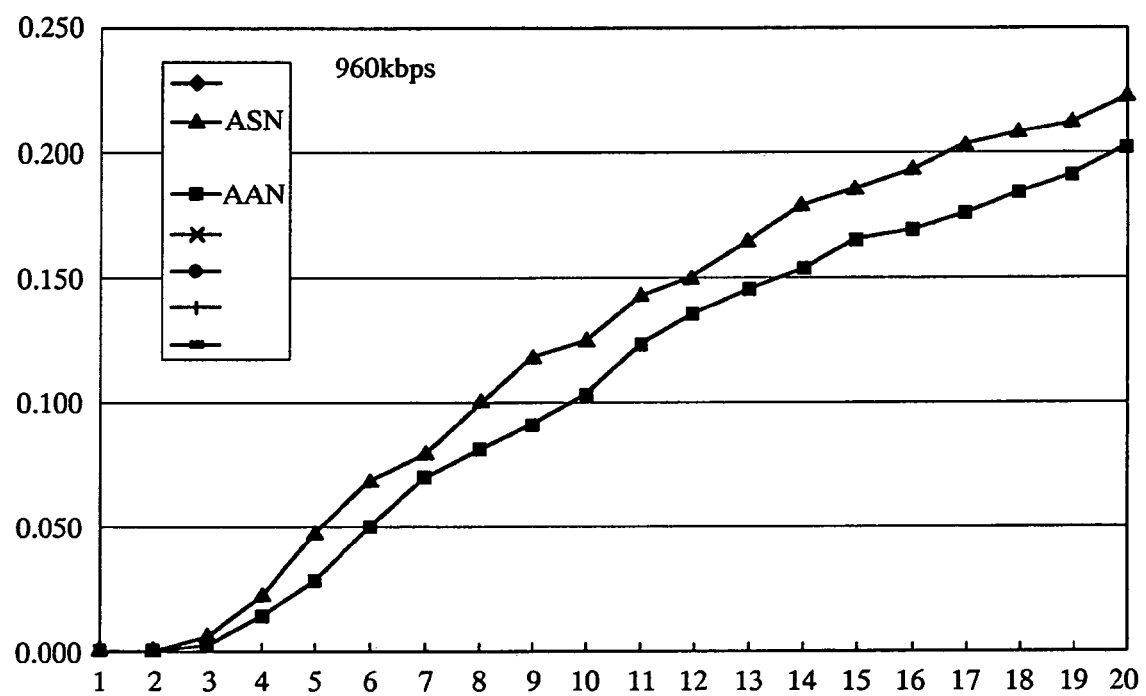
FIG. 5 is a graph illustrating a result of simulation for evaluating a bit error rate in each of a case in which the present invention is applied to WCDMA communication and a case in which the present invention is not applied thereto.
Figure 6:
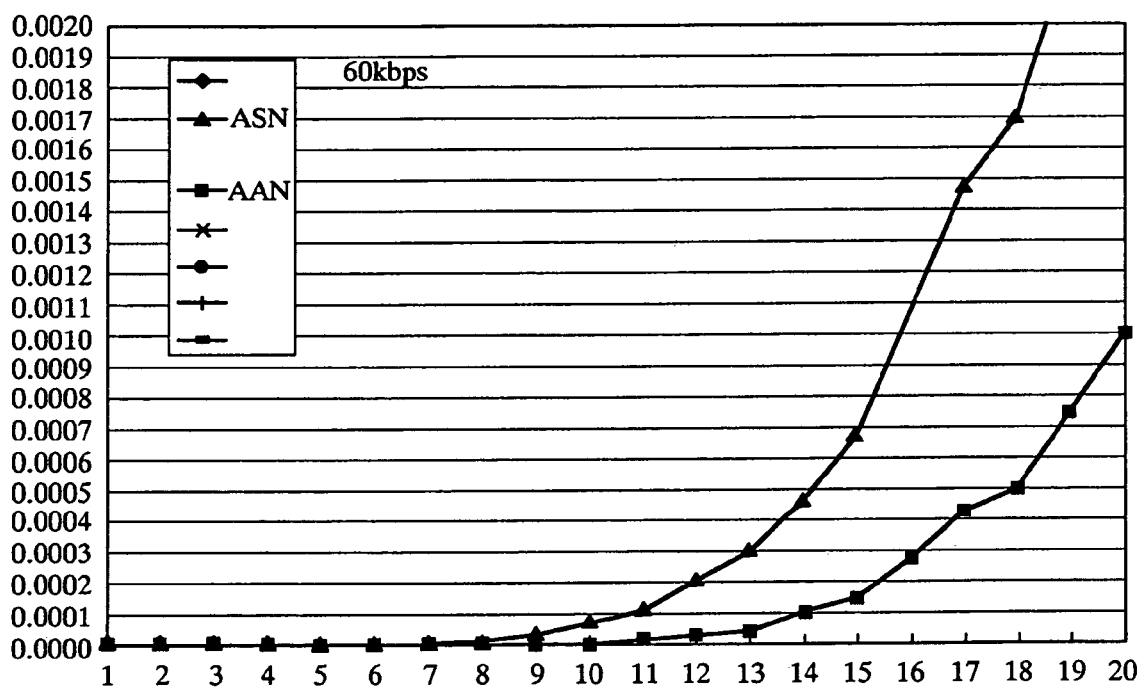
FIG. 6 is a graph illustrating a result of simulation for evaluating a bit error rate in each of a case in which the present invention is applied to WCDMA communication and a case in which the present invention is not applied thereto.
Figure 7:
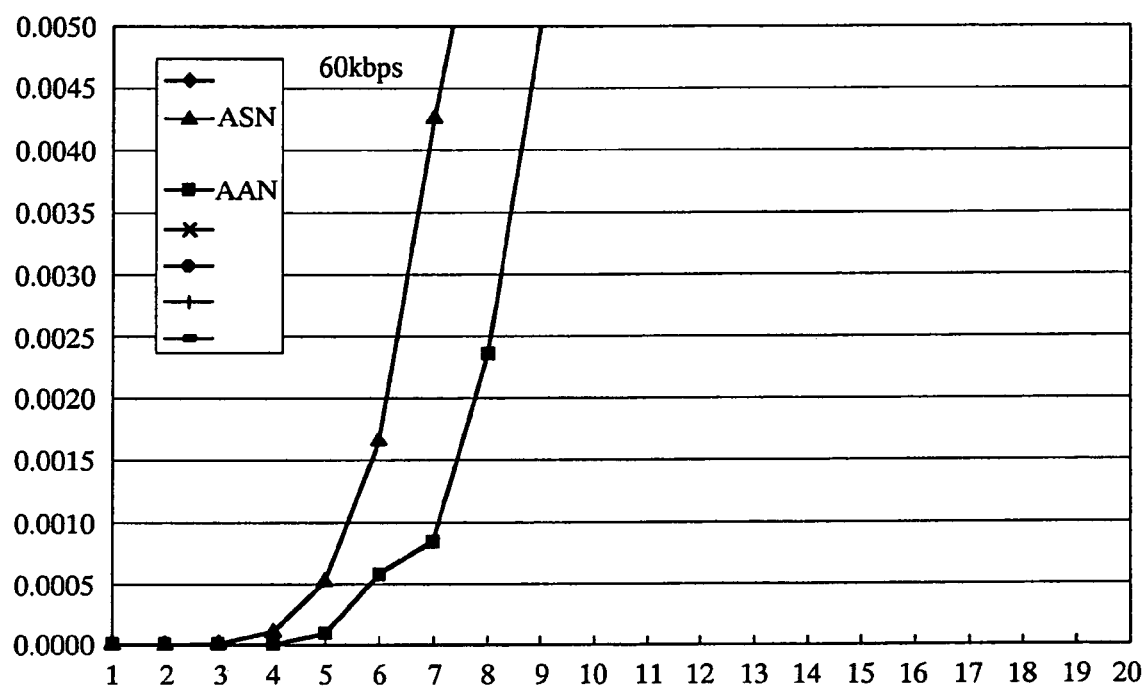
FIG. 7 is a graph illustrating a result of simulation for evaluating a bit error rate in each of a case in which the present invention is applied to WCDMA communication and a case in which the present invention is not applied thereto.
Figure 8:
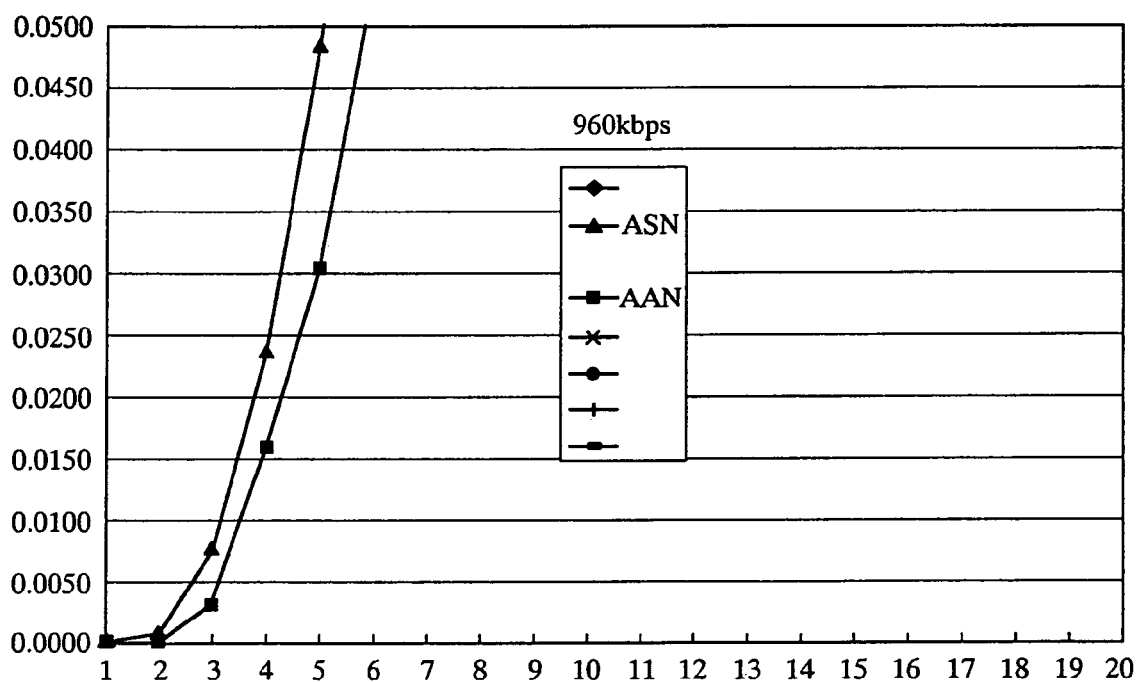
FIG. 8 is a graph illustrating a result of simulation for evaluating a bit error rate in each of a case in which the present invention is applied to WCDMA communication and a case in which the present invention is not applied thereto.

FIG. 2 is a schematic view illustrating an outline configuration of a receiving apparatus according to one embodiment of the present invention and this corresponds to the transmitter apparatus shown in FIG. 1. An explanation will be given with reference to this figure.

A receiver apparatus 201 of this embodiment includes a receiving section 202, a delaying section 203, a demodulating section 204, and an outputting section 205.

The receiving section 202 receives multiple signals as $a_1, \ldots, a_L$ ($1 \leq L$). In the transmitter apparatus 101 illustrated in FIG. 1, as a specific form of the transmitting section 105, there were the method using the I-channel and the Q-channel and the method using the different carrier frequency. In the former case, separation to the I-channel and the Q-channel is performed by the receiving section 202. In the latter case, a bandpass filter for each carrier frequency band may be used by the receiving section 202. In an example of this figure, L=2 is established, similar to the transmitter apparatus 101.

While, the delaying section 203 outputs multiple intermediate signals $p_1, \ldots, p_N$ that are obtained by delaying the multiple received signals $a_1, \ldots, a_L$ by $T-t_1, \ldots, T-t_N$ ($L \leq N$) where T is a predetermined constant time without being overlapped with one another, respectively. In the example of this figure, $a_1$ is delayed by delay time $T-t_1, \ldots, T-t_4$ and four signals $p_1, \ldots, p_4$ are obtained therefrom, and $a_2$ is delayed by delay time $T-t_5, \ldots, T-t_8$ and four signals $p_5, \ldots, p_8$ are obtained therefrom.

T may be any constant if it is larger than either delay time. However, numeral values of S and W are preferably used in view of comparison with the transmitter apparatus 101. Time $t_1$ to $t_N$ is decided in the same way as the corresponding transmitter apparatus 101. In this figure, the storing section 206 and the calculating section 207 perform the same processing as the storing section 106 and the calculating section 107. In this method, when an initial value a is once shared by the transmitter apparatus 101 and the receiver apparatus 201, the same value can be obtained even if they perform calculation of time ti and afterward independently of each other.

Additionally, such a method may be used where constant T is stored in the storing section 106 and the calculating section 207 calculates T-ti and notifies the result to the delaying section 203.

While, the demodulating section 204 outputs demodulated signals $r_1, \ldots, r_N$ that are obtained by demodulating multiple output signals $p_1, \ldots, p_N$. In the present embodiment, L spread spectrum demodulators 211 are used in accordance with the transmitter apparatus 101. In this figure, $p_1$ to $p_4$ and $p_5$ to $p_8$ are sent to a spread spectrum demodulator 211a and a spread spectrum demodulator 211b, respectively, and $r_1$ to $r_4$ and $r_5$ to $r_8$ are obtained from the former and the latter, respectively.

The respective spread spectrum demodulators 211 perform demodulation using the corresponding spreading codes in the spreading spectrum modulators 111 of the transmitter apparatus 101.

Then, the outputting section 205 outputs multiple output demodulated signals $r_1, \ldots, r_N$ as multiple transmitted synchronized signals.

(Experiment Result)

Regarding a case of the general WCDMA communication (corresponding to $t_1=t_2=0$) when L=N=2 was used a parameter and a case in which the present invention was applied to the WCDMA communication and each channel is asynchronized ($t_1$ and $t_2$ are decided based on the random number), comparison in the bit error rate was performed therebetween by a simulation experiment. The experiment was conducted using 60 kbps, 240 kbps, and 960 kbps according to data rates of the WCDMA standard. FIGS. 3 to 8 are graphs each illustrating an experiment result of the number of users (horizontal axis) and a bit error rate (vertical axis) where a data rate and a scale are changed.

In the graphs, "ASN" indicates a result of the general WCDMA communication and "AAN" indicates the result of the asynchronous channel WDCMA communication according to the present invention. For example, in the case of 60 kbps, when the bit error rate is 0.001, the number of users in the general WCDMA communication is 16, but the number of users in the asynchronous channel WDCMA communication is 20. When it is 0.002, the number of users in the general WCDMA communication is 12, but the number of users in the asynchronous channel WDCMA communication is 16. In this way, the present invention can have a large effect on a reduction in the bit error rate, and shows that the multiple signals can be efficiently separated.

Additionally, according to the aforementioned "Non-patent document 1" there can be obtained the analytical result in which an amount of interference noise in asynchronous user CDMA is small as compared with synchronous user CDMA. However, according to the present embodiment, the synchronized signals are positively asynchronized, so that the same effect can be obtained.

INDUSTRIAL APPLICABILITY

As explained above, according to the present invention, it is possible to provide a transmitter apparatus, which is suitable for transmitting multiple synchronized signals in such a way to be efficiently separated from one another at a receiving side, receiver apparatus, transmission method, and a program that causes a computer to execute these.

The invention claimed is:

1. A transmitter apparatus comprising:
an input receiving section that receives inputs of multiple synchronized signals $r_1, \ldots, r_N$;
an asynchronizing section that delays the multiple input received synchronized signals $r_1, \ldots, r_N$ by times $t_1, \ldots, t_N$, respectively, to output multiple asynchronized signals $v_1, \ldots, v_N$;
a modulating section that modulates the output multiple asynchronized signals $v_1, \ldots, v_N$ to output modulated signals $w_1, \ldots, w_L$ ($1 \leq L \leq N$); and
a transmitting section that transmits the output modulated signals $w_1, \ldots, w_L$, and
wherein the delay times $t_1, \ldots, t_N$ are respectively proportional to values $u_1, \ldots u_N$ which are computed from a prestored interger value a, a predetermned nonlinear transformation $f(\bullet)$ over a finite, field and the equations:
$u_1 = a$;
$u_{j+1} = f(u_j)$ ($1 \leq j \leq N$).

2. The transmitter apparatus according to claim 1, further comprising:
a storing section that stores the delay times $t_1, \ldots, t_N$ in advance,
wherein the asynchronizing section delays the respective multiple synchronized signals $r_1, \ldots, r_N$ by the time $t_1, \ldots, t_N$ stored in the storing section.

3. The transmitter apparatus according to claim 1, wherein the modulating section classifies the asynchronized signals $v_1, \ldots, v_N$ into L ($L \leq N$) signal groups to send the respective classified L signal groups to any one of L spread spectrum modulators not to be overlapped with one another to output the modulated signals $w_1, \ldots, w_L$.

4. The transmitter apparatus according to claim 3, wherein the transmitting section radio-transmits the respective modulated signals $w_1, \ldots, w_L$ by L radio frequency modulators each using a different carrier frequency.

5. The transmitter apparatus according to claim 3, wherein the transmitting section sends the modulated signals $w_1, \ldots, w_L$ to I-channels and Q-channels of each of L/2 radio frequency modulators each using a different carrier frequency not to be overlapped with one another to radio-transmit the respective obtained transmitting signals.

6. The transmitter apparatus according to claim 3, wherein L=2 is established.

7. The transmitter apparatus according to claim 1, wherein the delay times $t_1, \ldots, t_N$ are shorter than a clock period of the signals $r_1, \ldots, r_N$.

8. The transmitter apparatus according to claim 1, wherein the prestored value a is updated to $a=f(u_N)$ every time when predetermined time passes, and thereby the delay times $t_1, \ldots, t_N$ is updated.

9. The transmitter apparatus according to claim 1, wherein the predetermined nonlinear transformation $f(\bullet)$ over a finite field corresponds to any one of the following (a) to (e):
  (a) transformation using a Chebyshev polynomial of second or more degree,
  (b) transformation using Bernoulli mapping,
  (c) transformation $f(x)=2x^2-px+q \pmod{2^w}$ defined using integers p, q (p mod 4=1, $0 \leq q \leq 2^{w-1}$),
  (d) transformation using a remainder obtained by dividing any one of transformation results of (a) to (c) by a predetermined integer, and
  (e) transformation that is the same form as any one of the above (a) to (d) by a linear coordinate transformation.

10. A receiver apparatus comprising:
  a receiving section that receives multiple signals as $a_1, \ldots, a_L (1 \leq L)$;
  a delaying section that delays the respective multiple received signals $a_1, \ldots, a_L$ by time $T-t_1, \ldots, T-t_N$ ($L \leq N$) where T is predetermined constant time without being overlapped with one another to output multiple intermediate signals $p_1, \ldots, p_N$;
  a demodulating section that demodulates the multiple output intermediate signals $p_1, \ldots, p_N$ to output demodulated signals $r_1, \ldots, r_N$; and
  an outputting section that outputs the multiple output demodulated signals $r_1, \ldots, r_N$ as multiple transmitted synchronized signals, and
  wherein the delay times $t_1, \ldots t_N$ are respectively proportional to values $u_1, \ldots u_N$ which are computed from a prestored integer value a, a predetermined nonlinear transformation $f(\bullet)$ over a finite field, and the equations:
  $u_1=a$;
  $u_{j+1}=f(u_j) (1 \leq j \leq N)$.

11. The receiver apparatus according to claim 10, further comprising:
  a storing section that stores the predetermined constant time T and times $t_1, \ldots, t_N$ in advance,
  wherein the delaying section obtains delay times of the respective multiple synchronized signals $r_1, \ldots, r_N$ from time stored in the storing section and delays the synchronized signals by times $T-t_1, \ldots, T-t_N$.

12. The receiver apparatus according to claim 10, wherein the delaying section classifies the delay times $T-t_1, \ldots, T-t_N$ into L delay time groups, and uses the respective classified L delay time groups not to be overlapped with the received signals $a_1, \ldots, a_L$ to output the intermediate signals $p_1, \ldots, p_N$.

13. The receiver apparatus according to claim 12, where the receiving section obtains the respective received signals $a_1, \ldots, a_L$ from L radio frequency modulators each using a different carrier frequency.

14. The receiver apparatus according to claim 12, wherein the receiving section obtains the received signals $a_1, \ldots, a_L$ from I-channels and Q-channels of each of L/2 radio frequency modulators each using a different carrier frequency not to be overlapped with one another.

15. The receiver apparatus according to claim 14, wherein L=2 is established.

16. The receiver apparatus according to claim 10, wherein the delay times $t_1, \ldots, t_N$ are shorter than a clock period of the signals $r_1, \ldots, r_N$.

17. The receiver apparatus according to claim 10, wherein the prestored value a is updated to $a=f(u_N)$ every time when predetermined time passes, and thereby the delay times $t_1, \ldots, t_N$ is updated.

18. The receiver apparatus according to claim 10, wherein the predetermined nonlinear transformation $f(\bullet)$ over a finite field corresponds to any one of the following (a) to (e):
  (a) transformation using a Chebyshev polynomial of second or more degree,
  (b) transformation using Bernoulli mapping,
  (c) transformation $f(x)=2x^2-px+q \pmod{2^w}$ defined using integers p, q (p mod 4=1, $0 \leq q \leq 2^{w-1}$),
  (d) transformation using a remainder obtained by dividing any one of transformation results of (a) to (c) by a predetermined integer, and
  (e) transformation that is the same form as any one of the above (a) to (d) by a linear coordinate transformation.

19. A transmission method comprising:
  the input receiving step of receiving inputs of multiple synchronized signals $r_1, \ldots, r_N$;
  the asynchronizing step of delaying the multiple input received synchronized signals $r_1, \ldots, r_N$ by times $t_1, \ldots, t_N$, respectively, to output multiple asynchronized signals $v_1, \ldots, v_N$;
  the modulating step of modulating the output multiple asynchronized signals $v_1, \ldots, v_N$ to output modulated signals $w_1, \ldots, w_L (1 \leq L \leq N)$; and
  the transmitting step of transmitting the output modulated signals $w_1, \ldots, w_L$, and
  wherein the delay times $t_1, \ldots, t_N$ are respectively proportional to values $u_1, \ldots, u_N$ which are computed from a prestored integer value a, a predetermined nonlinear transformation $f(\bullet)$ over a finite field, and the equations:
  $u_1=a$; $u_{j+1}=f(u_1) (1 \leq j \leq N)$.

20. The transmission method according to claim 19,
  wherein a storing section that stores the delay times $t_1, \ldots, t_N$ in advance is used; and
  wherein the respective multiple synchronized signals $r_1, \ldots, r_N$ are delayed by the time $t_1, \ldots, t_N$ stored in the storing section in the asynchronizing step.

21. The transmission method according to claim 19, wherein the asynchronized signals $v_1, \ldots, v_N$ are classified into L ($L \leq N$) signal groups and the respective classified L signal groups are sent to any one of L spread spectrum modulators not to be overlapped with one another to output the modulated signals $w_1, \ldots, w_L$ in the modulating step.

22. The transmission method according to claim 21, wherein the respective modulated signals $w_1, \ldots, w_L$ are radio-transmitted by L radio frequency modulators each using a different carrier frequency in the transmitting step.

23. The transmission method according to claim 21, wherein the modulated signals $w_1, \ldots, w_L$ are sent to I-channels and Q-channels of each of L/2 radio frequency modulators each using a different carrier frequency not to be overlapped with one another to radio-transmit each of the obtained transmitting signals in the transmitting step.

24. The transmission method according to claim 23, wherein L=2 is established.

25. The transmission method according to claim 19, wherein the delay times $t_1, \ldots, t_N$ are shorter than a clock period of the signals $r_1, \ldots, r_N$.

26. The transmission method according to claim 19, wherein the prestored value a is updated to $a=f(u_N)$ every time when predetermined time passes, and thereby the delay times $t_1, \ldots, t_N$ is updated.

27. The transmission method according to claim 19, wherein the predetermined nonlinear transformation $f(\bullet)$ over a finite field corresponds to any one of the following (a) to (e):
   (a) transformation using a Chebyshev polynomial of second or more degree,
   (b) transformation using Bernoulli mapping,
   (c) transformation $f(x)=2 x^2-px+q(\mod 2^w)$ defined using integers p, q (p mod $4=1$, $0 \leq q \leq 2^{w-1}$),
   (d) transformation using a remainder obtained by dividing any one of transformation results of (a) to (c) by a predetermined integer, and
   (e) transformation that is the same form as any one of the above (a) to (d) by a linear coordinate transformation.

28. A reception method comprising:
   the receiving step of receiving multiple signals as $a_1, \ldots, a_L (1 \leq L)$;
   the delaying step of delaying the respective multiple received signals $a_1, \ldots, a_L$ by time $T-t_1, \ldots, T-t_N$ ($L \leq N$) where T is predetermined constant time without being overlapped with one another to output multiple intermediate signals $p_1, \ldots, p_N$;
   the demodulating step of demodulating the multiple output intermediate signals $p_1, \ldots, p_N$ to output demodulated signals $r_1, \ldots, r_N$; and
   the outputting step of outputting the multiple output demodulated signals $r_1, \ldots, r_N$ as multiple transmitted synchronized signals, and
   wherein the delay times $t_1, \ldots, t_N$ are respectively proportional to values $u_1, \ldots, u_N$ which are computed from a prestored integer value a, a predetermined nonlinear transformation $f(\bullet)$ over a finite field, and the equations:
   $u_1=a$;
   $u_{j+1}=f(u_j)(1 \leq j \leq N)$.

29. The reception method according to claim 28,
   wherein a storing section that stores the predetermined constant time T and times $t_1, \ldots, t_N$ in advance is used; and
   wherein delay times of the respective multiple synchronized signals $r_1, \ldots, r_N$ is obtained from time stored in the storing section and the synchronized signals are delayed by the time $T-t_1, \ldots, T-t_N$ in the delaying step.

30. The reception method according to claim 28, wherein the delay times $T-t_1, \ldots, T-t_N$ are classified into L delay time groups, and the respective classified L delay time groups are used not to be overlapped with the received signal $a_1, \ldots, a_L$ to output the intermediate signals $p_1, \ldots, p_N$ in the delaying step.

31. The reception method according to claim 30, where the respective received signals $a_1, \ldots, a_L$ are obtained from L radio frequency modulators each using a different carrier frequency in the receiving step.

32. The reception method according to claim 30, wherein the received signals $a_1, \ldots, a_L$ are obtained from I-channels and Q-channels of each of L/2 radio frequency modulators each using a different carrier frequency not to be overlapped with one another in the receiving step.

33. The reception method according to claim 32, wherein $L=2$ is established.

34. The reception method according to claim 28, wherein the delay times $t_1, \ldots, t_N$ are shorter than a clock period of the signals $r_1, \ldots, r_N$.

35. The reception method according to claim 28, wherein the prestored value a is updated to $a=f(u_N)$ every time when predetermined time passes, and thereby the delay times $t_1, \ldots, t_N$ is updated.

36. The reception method according to claim 28, wherein the predetermined nonlinear transformation $f(\bullet)$ over a finite field corresponds to any one of the following (a) to (e):
   (a) transformation using a Chebyshev polynomial of second or more degree,
   (b) transformation using Bernoulli mapping,
   (c) transformation $f(x)=2 x^2-px+q(\mod 2^w)$ defined using integers p, q (p mod $4=1$, $0 \leq q \leq 2^{w-1}$),
   (d) transformation using a remainder obtained by dividing any one of transformation results of (a) to (c) by a predetermined integer, and
   (e) transformation that is the same form as any one of the above (a) to (d) by a linear coordinate transformation.

37. A computer-readable information storage medium, having stored thereon instructions for execution by a computer, including FPGA (Field Programmable Gate Array), DSP (Digital Signal Processor), ASIC (Application Specific Integrated Circuit) to function as the respective sections described in claim 1.

38. A computer-readable information storage medium, having stored thereon instructions for execution by a computer, including FPGA (Field Programmable Gate Array), DSP (Digital Signal Processor), ASIC (Application Specific Integrated Circuit) to function as the respective sections described in claim 10.

* * * * *